(12) United States Patent
Selbrede et al.

(10) Patent No.: US 7,449,759 B2
(45) Date of Patent: Nov. 11, 2008

(54) ELECTROMECHANICAL DYNAMIC FORCE PROFILE ARTICULATING MECHANISM

(75) Inventors: Martin G. Selbrede, The Woodlands, TX (US); Carey King, Austin, TX (US); Dan Van Ostrand, Round Rock, TX (US)

(73) Assignee: Uni-Pixel Displays, Inc., The Woodlands, TX (US)

( * ) Notice: Subject to any disclaimer, the term of this patent is extended or adjusted under 35 U.S.C. 154(b) by 226 days.

(21) Appl. No.: 11/215,514

(22) Filed: Aug. 30, 2005

(65) Prior Publication Data

US 2007/0047051 A1    Mar. 1, 2007

(51) Int. Cl.
*H01L 29/82* (2006.01)
(52) U.S. Cl. .................. 257/415; 257/419; 359/230
(58) Field of Classification Search .................. 257/415, 257/419; 359/230
See application file for complete search history.

(56) References Cited

U.S. PATENT DOCUMENTS 5,999,307 A    12/1999   Whitehead et al.
6,307,663 B1   10/2001   Kowarz ..................... 359/231

FOREIGN PATENT DOCUMENTS

EP    1403055 A1    3/2004

*Primary Examiner*—Evan Pert
*Assistant Examiner*—Tan Tran
(74) *Attorney, Agent, or Firm*—Fish & Richardson P.C.; Kelly K. Kordzik

(57) ABSTRACT

An electromechanical dynamic force profile articulating mechanism for recovering or emulating true parallel plate capacitor actuation behaviors from deformable membranes used in MEMS systems. The curved deformation of flexible membranes causes their MEMS behavior to deviate from known interactions between rigid plates that maintain geometric parallelism during ponderomotive actuation. The present invention teaches three methods for reacquiring parallel plate behavior: superaddition or in situ integration of a rigid region within or upon the deformable MEMS membrane; creation of isodyne regions to secure parallelism by altering the force profile upon the membrane by introducing tuned and shaped voids within the conductive region associated with the membrane; and a hybrid composite approach wherein the conductive region is deposited after deposition of a raised rigid zone, thereby emulating isodyne behavior due to the increased inter-conductor distance in the vicinity of the rigid zone, in conjunction with rigidity benefits stemming directly from said zone.

21 Claims, 3 Drawing Sheets

ELECTROMECHANICAL DYNAMIC FORCE PROFILE ARTICULATING MECHANISM

TECHNICAL FIELD

The present invention relates in general to the field of MEMS devices, and more particularly to the field of MEMS-based flat panel displays, where the ability to control the shape and behavior of dynamically deformed membranes secures more desirable behaviors from the MEMS device in question.

BACKGROUND INFORMATION

MEMS-based systems, including flat panel displays that exploit the principle of frustrated total internal reflection (FTIR) to induce the emission of light from the system, may have to satisfy crucial physical criteria to function properly. The display system disclosed in U.S. Pat. No. 5,319,491, which is incorporated by reference in its entirety herein, as representative of a larger class of FTIR-based MEMS devices, illustrates the fundamental principles at play within such devices. Such a device is able to selectively frustrate the light undergoing total internal reflection within a (generally) planar waveguide. When such frustration occurs, the region of frustration constitutes a pixel suited to external control. Such pixels can be configured as a MEMS device, and more specifically as a parallel plate capacitor system that propels a deformable membrane between two different positions and/or shapes, one corresponding to a quiescent, inactive state where FTIR does not occur due to inadequate proximity of the membrane to the waveguide, and an active, coupled state where FTIR does occur due to adequate proximity, said two states corresponding to off and on states for the pixel. A rectangular array of such MEMS-based pixel regions, which are often controlled by electrical/electronic means, is fabricated upon the top active surface of the planar waveguide. This aggregate MEMS-based structure, when suitably configured, functions as a video display capable of color generation, usually by exploiting field sequential color and pulse width modulation techniques.

The criteria to be satisfied for such MEMS-based FTIR systems to function properly may involve control over the shape of the membrane being electrically deformed during both activation and deactivation. The simplest MEMS structure normally selected for such implementation involves using opposing conductors configured so that the presence of a potential difference between them entails an imposed Coulomb attraction, causing relative motion of one or both of the conductors and any other materials tied to them. Such a system is traditionally termed a parallel plate actuator system, where one of the conductors is fixed, while the other is disposed on a member that is either capable of motion (generally being affixed at its putative edges by appropriate tethers or standoff layers) or elastic deformation to controllably close the gap between the fixed and moveable conductor regions.

The electromechanical behavior of a parallel plate actuator system is usually optimal when the plates in question (the conductive regions across which a voltage potential is applied to induce relative motion between them) are rigid, parallel planes. Their rigidity contributes to keeping the plates parallel, assuming an otherwise appropriate distribution of ponderomotive force and concomitant fixturing or tethering of both the fixed and moveable elements by which the plates are mounted. If, for example, the moveable plate is not rigid, but elastic, it is clear that during the actuation event for such a system, there will be moments in time when the plates are no longer parallel to one another, due to geometric deformation of the non-rigid moveable plate under the influence of ponderomotive forces that naturally distribute themselves to secure the lowest potential energy state at all times during actuation.

During an elastic deformation that causes the respective plates to deviate from a mutually parallel spaced-apart relation, the electromechanical parameters for system behavior shift in significant ways that are, in most cases, regarded as deleterious and harmful to proper and/or optimal MEMS operation. A means to recover the more desirable behavior associated with a double-rigid-plate system, in the context of a system where one of the plates is quite flexible and capable of significant elastic deformation, would restore the desired MEMS behavior while retaining the other known advantages accruing to a MEMS defined exploiting elastic deformation to implement controllable relative motion of the plates.

Therefore, there is a need in the art for a means to recover MEMS behavior associated with rigid, parallel plate actuator elements when one or more of the elements is not actually rigid but capable of deformation. A MEMS device that enjoys the electromechanical behavior profile associated with rigid plate interaction while actually being composed of one or more non-rigid plate structures would bring the benefits of both architectures (rigid and non-rigid) to bear on a single MEMS device structure.

SUMMARY

The problems outlined above may at least in part be solved in one of three ways. First, where an elastic deformable membrane serves as the primary component undergirding the moveable member of a parallel plate MEMS actuator system, one can locally rigidize said membrane by intimate localized superaddition of a rigid material onto the membrane to recover approximately-parallel dynamic behaviors within the desired limits of the applied performance criteria for the system.

Second, geometrically articulating the shape of the conductive region on one, or the other, or both, of the conductive planes, can lead to electromechanical behaviors that can adequately emulate the desired rigid plate motion. The simplest example of this is to place a circular hole in the conductive plane, so that no electrostatic attractive forces are exerted upon the elastic membrane in the vicinity of the hole (where no conductor exists). The membrane is then deformed by forces acting at the perimeter of the circular hole and beyond. The forces at the perimeter of the circular hole will form an isodyne (a region of equal ponderomotive forces), which is the essential behavior of a rigid plate (whereby such equality of ponderomotive force is gained by keeping the respective conductive planes parallel to one another). The center of the deforming region, which would normally have a higher force due to deformational proximity and concomitant smaller gap, has no force acting upon it due to the deliberate omission of a conductor in that region. This annular isodyne region arises whether the hole in the conductive plane is situated on either, or both, of the conductive regions, but it need only be situated on one of them, thereby obviating the need for multiple precision registration of layers during fabrication of such MEMS devices.

Third, a hybridization of the first two methods can readily be configured, so that it is possible to significantly enhance the desired behavior with far less superadded material than would normally be required. In this method, fabrication sequence becomes important. The superadded material to enhance rigidity is added first, and then the conductor region is deposited on top of this structure. One gains two benefits as a consequence of this architecture: the direct benefit of rigidization due to the superadded material, and the creation of an approximated isodyne structure. The latter effect stems from the fact that, although no hole is present in the conductor, the central region of the moveable conductor is separated from the opposing fixed conductive plane by a larger distance due to the presence of the superadded material. This approximates the effect of a hole in the conductive plane, except that a small force, rather than no force, arises at the center of the architecture. The region around the superadded rigid element functions as an isodyne no less so than before, so that this hybrid architecture yields desirable electromechanical behaviors due to both explicit rigidization and isodyne configuration. The benefits of this hybrid method include reduced superaddition of rigidized material and simplicity of construction of isodynes without the need to etch or otherwise explicitly create holes in one or more of the conductive planes.

The foregoing has outlined rather broadly the features and technical advantages of one or more embodiments of the present invention in order that the detailed description of embodiments of the present invention that follows may be better understood. Additional features and advantages of embodiments of the present invention will be described hereinafter which form the subject of the claims.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, components have been shown in generalized form in order not to obscure the present invention in unnecessary detail. For the most part, details concerning considerations of controlled selective MEMS actuation (i.e., actual operation of a rectangular n×m array of MEMS devices) and the like have been omitted inasmuch as such details are not necessary to obtain a complete understanding of the present invention and, while within the skills of persons of ordinary skill in the relevant art, are not directly relevant to the utility and value provided by the present invention.

The principles of operation to be disclosed immediately below assume the desirability of parallel plate MEMS actuator systems maintaining true parallelism between the respective planar conductors that are in relative motion with respect to one another during MEMS actuation (whether activation or deactivation). Such desirability may hinge on exploitation of the well-known one-third-gap instability that inheres in parallel plate capacitor electrostatic actuators, on exploitation of non-linear behavior and/or hysteresis, or other electromechanical factors.

Among the technologies (flat panel display or other candidate technologies that exploit the principle of frustrated total internal reflection) that lend themselves to implementation of the present invention is the flat panel display disclosed in U.S. Pat. No. 5,319,491, which is hereby incorporated herein by reference in its entirety. The use of a representative flat panel display example throughout this detailed description shall not be construed to limit the applicability of the present invention to that field of use, but is intended for illustrative purposes as touching the matter of deployment of the present invention.

Figure 3:
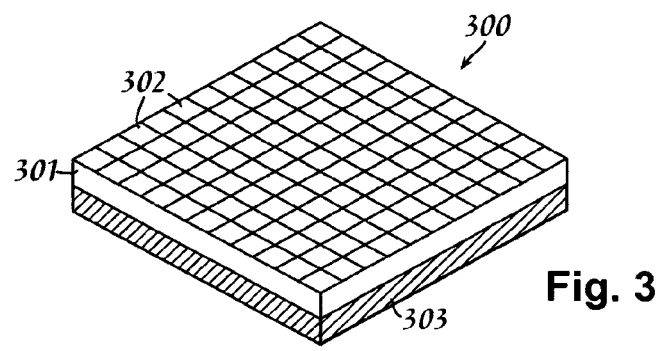
FIG. 3 illustrates a perspective view of a flat panel display suitable for implementation of the present invention.

Such a representative flat panel display may comprise a matrix of optical shutters commonly referred to as pixels or picture elements as illustrated in FIG. 3. FIG. 3 illustrates a simplified depiction of a flat panel display 300 comprised of a light guidance substrate 301 which may further comprise a flat panel matrix of pixels 302. Behind the light guidance substrate 301 and in a parallel relationship with substrate 301 may be a transparent (e.g., glass, plastic, etc.) substrate 303. It is noted that flat panel display 300 may comprise other elements than illustrated such as a light source, an opaque throat, an opaque backing layer, a reflector, and tubular lamps, as disclosed in U.S. Pat. No. 5,319,491.

Figure 4A:
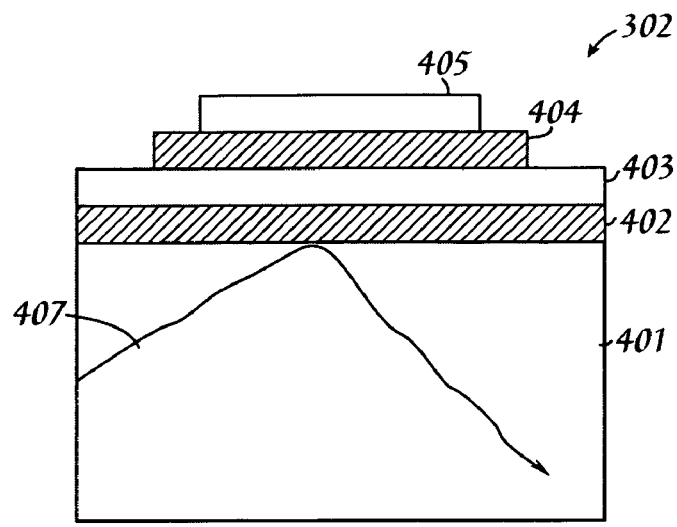
FIG. 4A illustrates a side view of a pixel in a deactivated state in accordance with an embodiment of the flat panel display of FIG. 3.
Figure 4B:
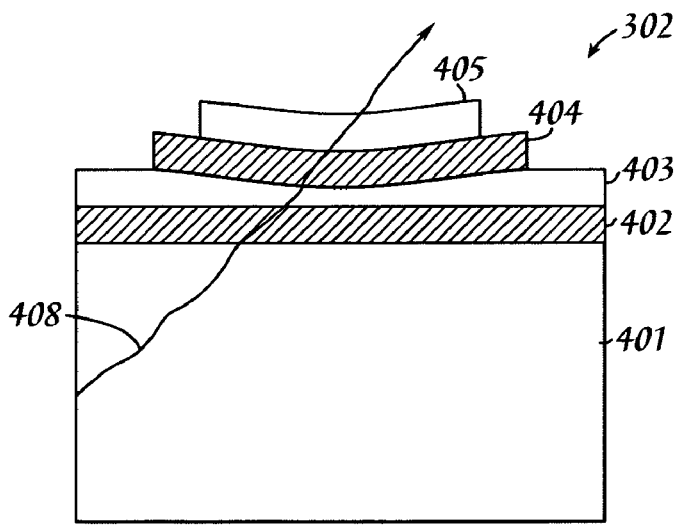
FIG. 4B illustrates a side view of a pixel in an activated state in accordance with an embodiment of the flat panel display of FIG. 3.

Each pixel 302, as illustrated in FIGS. 4A and 4B, may comprise a light guidance substrate 401, a ground plane 402, a deformable elastomer layer 403, and a transparent electrode 404.

Pixel 302 may further comprise a transparent element shown for convenience of description as disk 405 (but not limited to a disk shape), disposed on the top surface of electrode 404, and formed of high-refractive index material, possibly the same material as comprises light guidance substrate 401.

In this particular embodiment, it is important that the distance between light guidance substrate 401 and disk 405 be controlled very accurately. In particular, it has been found that in the quiescent state, the distance between light guidance substrate 401 and disk 405 should be approximately 1.5 times the wavelength of the guided light, but in any event this distance is greater than one wavelength. Thus, the relative thicknesses of ground plane 402, deformable elastomer layer 403, and electrode 404 are adjusted accordingly. In the active state, disk 405 is pulled by capacitative action, as discussed below, to a distance of less than one wavelength from the top surface of light guidance substrate 401.

In operation, pixel 302 exploits an evanescent coupling effect, whereby TIR (Total Internal Reflection) is violated at pixel 302 by modifying the geometry of deformable elastomer layer 403 such that, under the capacitative attraction effect, a concavity 406 results (which can be seen in FIG. 4B). This resulting concavity 406 brings disk 405 within the limit of the light guidance substrate's evanescent field (generally extending outward from the light guidance substrate 401 up to one wavelength in distance). The electromagnetic wave nature of light causes the light to "jump" the intervening low-refractive-index cladding, i.e., deformable elastomer layer 403, across to the coupling disk 405 attached to the electrostatically-actuated dynamic concavity 406, thus defeating the guidance condition and TIR. Light ray 407 (shown in FIG. 4A) indicates the quiescent, light guiding state. Light ray 408 (shown in FIG. 4B) indicates the active state wherein light is coupled out of light guidance substrate 401.

The distance between electrode 404 and ground plane 402 may be extremely small, e.g., 1 micrometer, and occupied by deformable layer 403 such as a thin deposition of room temperature vulcanizing silicone. While the voltage is small, the electric field between the parallel plates of the capacitor (in effect, electrode 404 and ground plane 402 form a parallel plate capacitor) is high enough to impose a deforming force on the vulcanizing silicone thereby deforming elastomer layer 403 as illustrated in FIG. 4B. By compressing the vulcanizing silicone to an appropriate fraction, light that is guided within guided substrate 401 will strike the deformation at an angle of incidence greater than the critical angle for the refractive indices present and will couple light out of the substrate 401 through electrode 404 and disk 405.

The electric field between the parallel plates of the capacitor may be controlled by the charging and discharging of the capacitor which effectively causes the attraction between electrode 404 and ground plane 402. By charging the capacitor, the strength of the electrostatic forces between the plates increases thereby deforming elastomer layer 403 to couple light out of the substrate 401 through electrode 404 and disk 405 as illustrated in FIG. 4B. By discharging the capacitor, elastomer layer 403 returns to its original geometric shape thereby ceasing the coupling of light out of light guidance substrate 401 as illustrated in FIG. 4A.

As stated in the Background Information section, certain parallel plate capacitor actuators, such as the one in FIG. 4, exhibit superior control characteristics when the two plates upon which the charges are placed and removed remain in a spaced-apart relation that is predominantly parallel regardless of the excursion or deformation of either of its members. It is noteworthy that the device in FIG. 4 does not exhibit such parallelism as configured, and that the membrane being deformed causes the distance between the upper and lower conductors (electrode 404 and disk 405) to be a function of distance from the center of the mechanical system. The curved nature of the actuated conductor in FIG. 4B is not considered desirable if true parallel plate capacitor actuator behavior is required. A mechanism to permit actuation while maximizing geometric parallelism between the electrodes at all times is needed.

The device of FIG. 4 serves as a pertinent example that will be used, with some modifications for the purpose of generalization, throughout this disclosure to illustrate the operative principles in question. It should be understood that this electrical example, proceeding from U.S. Pat. No. 5,319,491, is provided for illustrative purposes as a member of a class of valid candidate applications and implementations, and that any device, comprised of any system exploiting the principles that inhere in parallel plate capacitor actuator systems, can be enhanced with respect to electromechanical control where deviation from desired control behavior stems from deviations from geometric parallelism between the respective conductors involved in driving the mechanical motion (by membrane deformation, member tethering, or other means). The present invention governs a mechanism for recovering and maximizing conductor parallelism for a large family of devices that meet certain specific operational criteria regarding the implementation of parallel plate capacitor actuator principles, while the specific reduction to practice of any particular device being so enhanced imposes no restriction on the ability of the present invention to enhance the behavior of the device.

Figure 1:
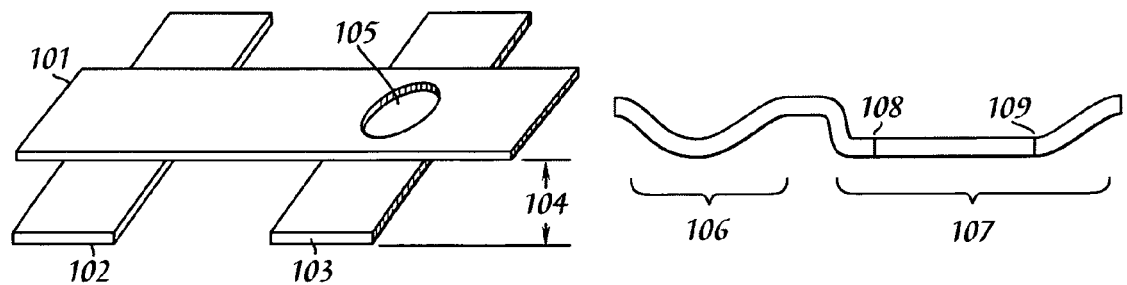
FIG. 1 illustrates an embodiment of the present invention utilizing holes in the conductive plane to achieve articulated isodyne geometries yielding quasi-parallel-plate behavior during MEMS actuation.

FIG. 1 depicts an embodiment of the present invention where electromechanical force articulation is achieved by adjusting the geometry of the conductors involved in parallel plate capacitor actuation. For the sake of simplified illustration, the conductors are shown in isolation from other mechanical components of such a system (which may vary significantly from application to application). The components not illustrated may include deformable layers upon which the conductors are deposited or embedded, and/or standoff layers to keep the conductors in appropriate spaced-apart relation. Such components are disclosed in FIG. 5 so that a fuller representative cross-section can be appealed to within this detailed description, so that their intentional omission in FIG. 1 (and FIG. 2) should not be construed as anything more than a means to clarify rather than obscure the present invention and its conceptual core.

Figure 2:
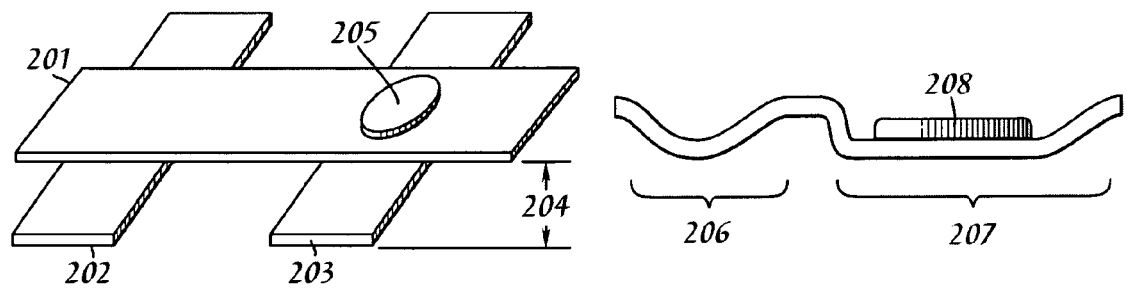
FIG. 2 illustrates an embodiment of the present invention utilizing superadded localized rigid regions to achieve quasi-parallel-plate behavior during MEMS actuation.

An arbitrary number and spatial configuration of conductors is chosen in FIGS. 1 and 2 to illustrate the principle of operation of each embodiment. The present invention is not tied to any given approach to applying charges to any of the conductors, drive mechanisms, or fabricational schemas, insofar as it operates independently of all such considerations. For illustrative contrast, two separate systems are shown side by side so that the impact of the implementation of the present invention can be clearly understood and its utility discerned. One conductor, a long planar strip 101, may be arbitrarily understood to controllably and selectively receive a positive charge. Two other conductors, 102 and 103, also long planar strips which are also co-planar, may be arbitrarily understood to controllably and selectively receive a negative charge. Conductor 101 is in spaced-apart relation to conductors 102 and 103, such that the separation between 101 and 102 in the uncharged state is always distance 104, and the separation between 101 and 103 is also distance 104 when uncharged. The region of orthogonal overlap between 101 and 102 shall be deemed to constitute the unarticulated actuator where the present invention is not implemented. The region of orthogonal overlap between 101 and 103 shall be deemed to constitute the articulated actuator where the present invention is implemented. The specific implementation of the present invention is evidenced by the fact that conductor 101 is not contiguous, but exhibits a non-conductive hole 105 situated in the planar conductive strip, which hole is arbitrarily shown to be circular in shape. The electromechanical behaviors arising between the positive and negative crossover regions (overlap of 101 and 102, and overlap of 101 and 103 in the presence of hole 105) are markedly different, showing the powerful effect of the presence of the hole 105 on the actuation geometries, where the conductors (or the elastic carrier membranes, not shown, upon which the conductors are deposited or within which the conductors are embedded) deform in accordance with the local electrical fields and resulting Coulomb attraction profile.

When opposing charges are placed across 101 and 102, Coulomb attraction causes continuous deformation of the conductor and any associated membrane to which it is tied, such that the potential energy stored as a result of mechanical deformation is minimized. This results in a smooth curving of 101 in the region of 102 that is depicted in cross-sectional view 106. Adjacent to this unarticulated region (where the present invention is not implemented) is the other cross-over that does include an embodiment of the present invention, indicated by the presence of hole 105. The presence of the hole 105 causes electrical force to form an isodyne region (region of equivalent force) around the hole's perimeter, as measured from said perimeter of 105 to the conductor of opposite charge 103. The isodyne region is annular in shape in this example, by virtue of the arbitrary choice of shape for hole 105 (namely, a circle). In cross-sectional view, the resulting mechanical deformation of planar conductor 101 during application of opposing charges on 101 and 103 in the vicinity of their respective overlap (which coincides with the presence of the hole in the conductor 105) results in a very different actuated profile 107. The cross-sectional boundaries of hole 105 are shown as cutaway lines 108 and 109 respectively. The Coulomb attraction is limited to inter-conductor interaction, which means the region between 108 and 109 are not directly acted upon by electrostatic force. Consequently, the region between 108 and 109 is pulled at its perimeter, and the force at the perimeter is identical where the hole 105 is properly centered in the electrostatic field.

Comparing the respective behaviors where the present invention is not implemented 106 and where it is implemented 107 by virtue of the shaped conductor (hole 105 causing an annular isodyne to arise between 101 and 103 in the overlap region between them), one can see that parallelism between the conductors of opposing charge can be better maintained where the present invention is implemented. The force between the plates is altered as to its distribution between the plates, and is thus articulated by virtue of conductor geometries chosen to create isodyne regions. Isodynes inherently preserve parallelism between the respective plates of a parallel plate capacitor system, even when the plates are capable of elastic deformation during excursion.

FIG. 2 shows a second embodiment of the present invention, utilizing the superaddition of rigid regions in specific locations to secure improved parallelism between conductors anchored to deformable membranes (not shown for clarity's sake). For illustrative contrast, two separate systems are shown side by side so that the impact of the implementation of the present invention can be clearly understood and its utility discerned. One conductor, a long planar strip 201, may be arbitrarily understood to controllably and selectively receive a positive charge. Two other conductors, 202 and 203, also long planar strips which are also co-planar, may be arbitrarily understood to controllably and selectively receive a negative charge. Conductor 201 is in spaced-apart relation to conductors 202 and 203, such that the separation between 201 and 202 in the uncharged state is always distance 204, and the separation between 201 and 203 is also distance 204 when uncharged. The region of orthogonal overlap between 201 and 202 shall be deemed to constitute the unarticulated actuator where the present invention is not implemented. The region of orthogonal overlap between 201 and 203 shall be deemed to constitute the articulated actuator where the present invention is implemented. The specific implementation of the present invention is evidenced by the fact that conductor 201 exhibits a superadded rigidizing element 205 situated on or within the planar conductive strip, which element is arbitrarily shown to be circular in shape (thus comprising a disc). Element 205 may be of arbitrary thickness and mechanical composition, and is designed to locally increase the mechanical stiffness and rigidity of the conductor 201 in the immediate vicinity of 205, and/or the rigidity of any associated membrane upon which 201 is deposited or in which 201 is embedded (which membrane is not shown). The electromechanical behaviors arising between the positive and negative crossover regions (overlap of 201 and 202, and overlap of 201 and 203 in the presence of hole 105) are essentially identical, but the differential rigidity at element 205 causes the deformation to not undergo its default behavior. Element 205 provides internal resistance to deformation of 201 (and/or associated elastic membranes) in the vicinity of 205, thereby articulating the geometric results arising from application of opposing electrical charges to conductors 201 and 203.

When opposing charges are placed across 201 and 202, Coulomb attraction causes continuous deformation of the conductor and any associated membrane to which it is tied, such that the potential energy stored as a result of mechanical deformation is minimized. This results in a smooth curving of 201 in the region of 202 that is depicted in cross-sectional view 206. Adjacent to this unarticulated region (where the present invention is not implemented) is the other cross-over that does include an embodiment of the present invention, indicated by the presence of rigidizing element 205, arbitrarily shaped as a circular disc superadded to 201. The presence of the disc 205 alters the mechanical deformation behavior of conductor 201 and any associated membranes (not shown). In cross-sectional view, the resulting mechanical deformation of planar conductor 201 during application of opposing electrical charges on 201 and 203 in the vicinity of their respective overlap (which coincides with the presence of the disc-shaped rigidizing element 205 super-added to the conductor 201) results in a very different actuated profile 207. The presence of element 205, shown in cross-section as element 208, results in the more flattened deformation profile of 207, which thereby maintains greater parallelism between 201 and 203 during electromechanical actuation through application of Coulomb attraction. Consequently, element 208 causes the deforming elements to resist deviation from parallel spaced-apart relation during electrostatic actuation.

Comparing the respective behaviors where this second embodiment of the present invention is not implemented 206 and where it is implemented 207 by virtue of the superadded rigidizing element 205 (208 in cross-section), one can see that parallelism between the conductors of opposing charge can be better maintained where the present invention is implemented. Deviation from parallel spaced-apart relation of the conductors during electromechanical actuation is achieved by locally constraining the elastic deformation during excursion by directly mechanical means.

Figure 5:
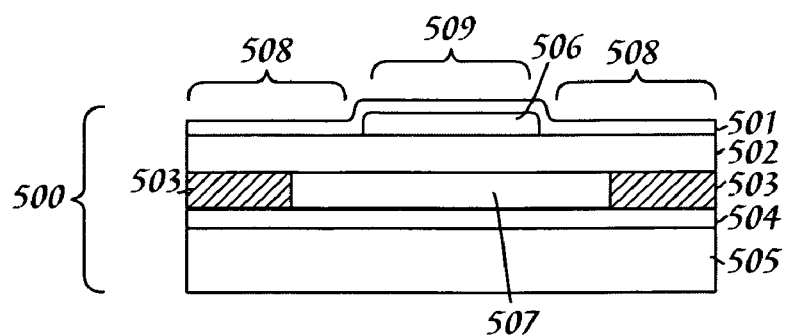
FIG. 5 illustrates an embodiment of the present invention that combines isodyne-like behaviors arising out of conductive region geometry resulting from conductor deposition or overlay upon localized superadded rigidized regions, thereby adjusting the force profile to approximate an annular isodyne architecture.

The two embodiments disclosed in FIGS. 1 and 2 can be hybridized, resulting in a third embodiment that delivers the desired mechanical profiles. FIG. 5 illustrates the hybridization of the first two embodiments in cross-section, and provides previously undisclosed ancillary elements that commonly comprise microelectromechanical systems (MEMS) based on parallel plate capacitor actuator architectures. Shown in cross-section in FIG. 5 is the single cross-over point between opposing conductors 500, which corresponds to the crossover regions between planar conductors 101 and 103 in FIG. 1, and between planar conductors 201 and 203 in FIG. 2. The behavior resulting from implementation of the hybridized third embodiments will be analogous to that illustrated at either 107 or 207, wherein the deformation is controlled to maximize a parallel spaced-apart relation of the respective conductors during application of opposing charges.

Planar conductor 501 corresponds to its counterparts 101 and 201 in FIGS. 1 and 2, respectively, while planar conductor 504 corresponds to its counterparts 103 and 203 in FIGS. 1 and 2, respectively. Additional ancillary elements are presented, although it is to be understood that the present invention is in not limited by any specific implementation such as provided for representative, illustrative purposes in FIG. 5. Conductor 504 is situated on a supporting rigid substrate 505, while conductor 501 is situated on a deformable elastic membrane 502. Membrane 502 is kept in spaced-apart parallel relation from 504 and 505 by fixed standoff structures 503, which surround a void 507 into which membrane 502 (and conductor 501) are free to move by deformation caused by application of opposite electrical charges to 501 and 504 causing Coulomb attraction to arise between them. Centered over the void 507 is a rigidizing element 506 situated on the elastic membrane 502. Conductor 501 is deposited over the combined structure of membrane 502 and element 506, such that it bears a curved cross-section as shown in FIG. 5. Conductor 501 in the regions around element 506 (namely, in the peripheral regions 508) is at a fixed distance from opposing conductor 504 in the quiescent (inactivated) state, while conductor 501, following the contour of element 506 in region 509, is at a farther distance from opposing conductor 504 in said quiescent state.

Two separate principles work together in this third, hybridized embodiment of the present invention to secure improved parallelism during actuation and deformation of the membrane 502 when opposing charges are applied to conductors 501 and 504 (during which time the elastic 502 and associated conductor 501 mechanically deform and occupy a significant region of the void 507, whereby it is even possible that membrane 502 will come into contact with conductor 504). First, the presence of rigidizing element 506 means that the behaviors that inhere in FIG. 2 at region 207 will also arise, and for the same reason: the elastic membrane 502 is restricted from flexing in the vicinity of the rigidizing element 506. Second, the fact that the presence of the rigidizing element 506 causes the conductor 501 to be tiered with respect to spacing between it and opposing conductor 504 means two different force profiles, based on different spatial separations of the conductors, are present. The increased separation of the conductors in region 509 results in similar, but not entirely identical, behavior as compared to the hole 105 in the conductor 101. An imperfect isodyne is created, because the force at the perimeter of the rigidizing element 506 (at regions marked 508) is greater than it is measured through the body of element 506 (region marked 509). Accordingly, the membrane 502 is pulled down more strongly at the perimeter of 506, resulting in generation of a partial quasi-isodyne region at that perimeter. The thicker element 506 is, the greater the conductor separation between 501 and 504 becomes at 509 versus 508, and the more closely the electrical force profile of this system approaches that disclosed in FIG. 1 at region 107. The limiting, albeit impractical, case of element 506 being of infinite thickness is analogous to a true hole in the conductor, like hole 105 in FIG. 1, but the desired behavior occurs far short of this limit, where the thickness of element 506 only incrementally alters the separation of conductors 501 and 504 in the region 509 as compared to 508.

It can be appreciated that the composition of rigidizing element 506 may be identical to that of membrane 502, and can even be a protuberance on 502 fabricated by molding techniques, or by etching.

This third embodiment of the present invention shown in cross-sectional view in FIG. 5 provides both electrical force articulation and mechanical resistance to undesired localized deformation, therefore combining the preceding two embodiments into a valuable new hybrid. An added advantage of the invention illustrated in FIG. 5 is relative ease of fabrication, since the quasi-isodyne behavior arises automatically by depositing the conductor on top of the membrane 502 which already has rigidizing elements 506, of appropriately selected size and shape, distributed on its surface as warranted or dictated by the target application in hand. A further advantage is discerned by comparing this third hybrid embodiment to the simple rigidized element approach of FIG. 2. It can readily be understood that the thickness of the rigidizing element can be reduced in the hybrid embodiment, since some of the burden of achieving parallelism during actuation is taken over by the quasi-isodyne electrostatic force profile articulation. Since the burden is shared between mechanical and electrical means to acquire the desired actuation behaviors, the designer of such systems has the option to reduce the thickness of the rigidizing element in light of the electrostatic contribution inherent in the core architecture of this third embodiment.

Figure 6:
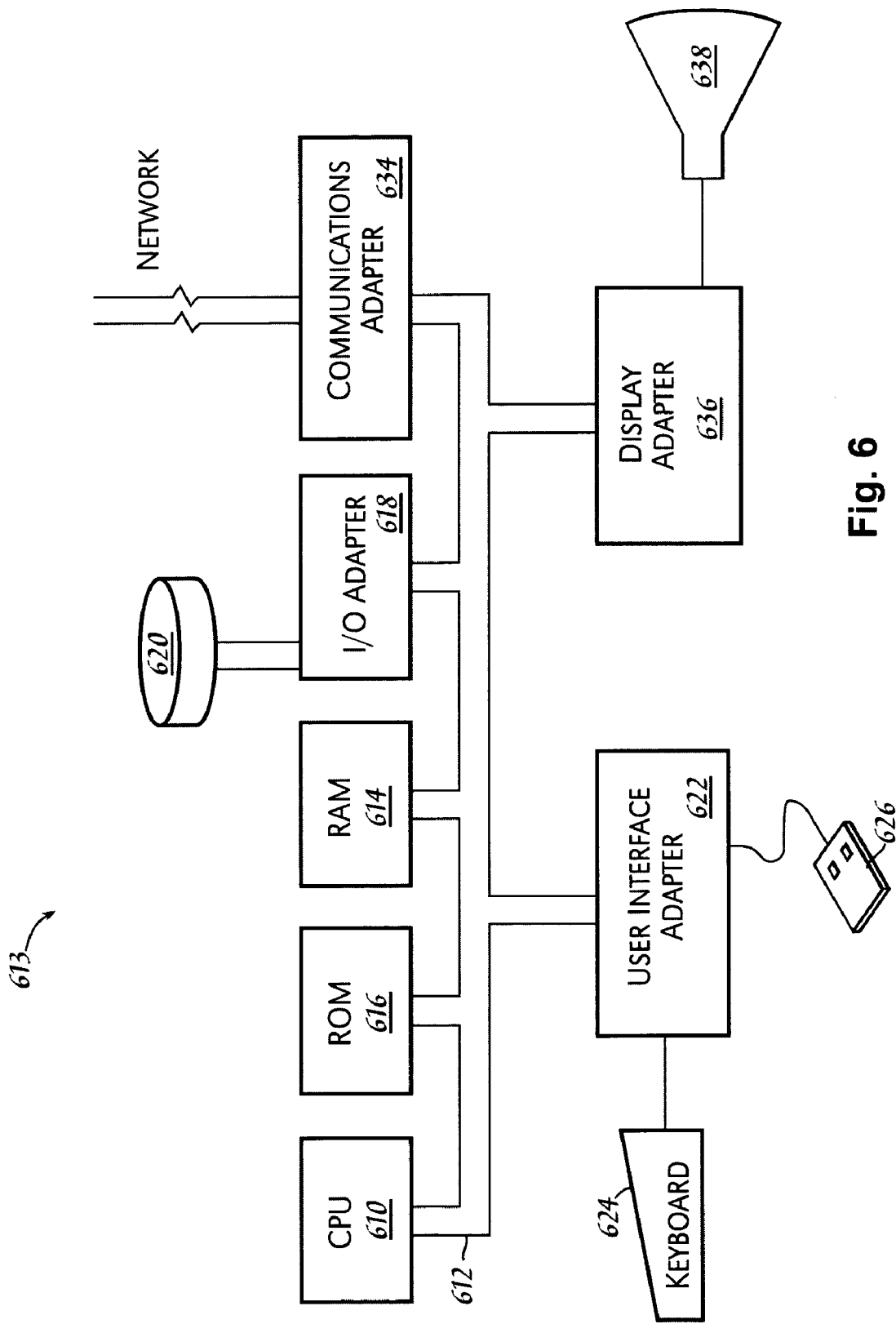
FIG. 6 illustrates a data processing system in accordance with an embodiment of the present invention.

A representative hardware environment for practicing the present invention is depicted in FIG. 6, which illustrates an exemplary hardware configuration of data processing system 613 in accordance with the subject invention having central processing unit (CPU) 610, such as a conventional microprocessor, and a number of other units interconnected via system bus 612. Data processing system 613 includes random access memory (RAM) 614, read only memory (ROM) 616, and a disk adapter 618 for connecting peripheral devices such as disk unit 620 to bus 612, user interface adapter 622 for connecting keyboard 624, mouse 626, and/or other user interface devices such as a touch screen device (not shown) to bus 612, communication adapter 634 for connecting data processing system 613 to a data processing network, and display adapter 636 for connecting bus 612 to display device 638. Display device 638 may implement any of the embodiments described herein. Any of the displays described herein may include pixels such as shown in FIGS. 4A and 4B. CPU 610 may include other circuitry not shown herein, which will include circuitry commonly found within a microprocessor, e.g., execution unit, bus interface unit, arithmetic logic unit, etc. CPU 610 may also reside on a single integrated circuit.

The invention claimed is:

1. An apparatus, comprising:
   a first conductor residing on a first portion of a deformable elastic membrane;
   a second conductor residing on a rigid substrate;
   a standoff structure surrounding a void, wherein said standoff structure keeps said deformable elastic membrane in a spaced-apart parallel relation from said second conductor; and
   a rigidizing element residing on a second portion of said deformable elastic membrane, wherein said rigidizing element is centered over said void, wherein said first conductor resides on said rigidizing element residing over, said second portion of said deformable elastic membrane.

2. The apparatus as recited in claim 1, wherein said first conductor in a region around said rigidizing element is at a fixed distance from said second conductor in a inactivated state, wherein said first conductor following a contour of said rigidizing element is at a farther distance from said second conductor in said inactivated state.

3. The apparatus as recited in claim 1, wherein said first conductor and said deformable elastic membrane are free to move by deformation caused by an application of opposite electrical charges to said first conductor and to said second conductor.

4. The apparatus as recited in claim 3, wherein when opposite electrical charges are applied to said first conductor and to said second conductor said deformable elastic membrane is restricted from flexing in a vicinity of said rigidizing element.

5. The apparatus as recited in claim 1, wherein said rigidizing element causes said first conductor to be tiered with respect to spacing between said first conductor and said second conductor thereby causing two different force profiles.

6. The apparatus as recited in claim 1, wherein a force at a perimeter of said rigidizing element is greater than through a body of said rigidizing element.

7. The apparatus as recited in claim 6, wherein said deformable elastic membrane is pulled down more strongly at said perimeter of said rigidizing element than at said body of said rigidizing element.

8. A display system, comprising:
a plurality of pixels on a display, wherein each of said plurality of pixels comprises:
a first conductor residing on a first portion of a deformable elastic membrane;
a second conductor residing on a rigid substrate;
a standoff structure surrounding a void, wherein said standoff structure keeps said deformable elastic membrane in a spaced-apart parallel relation from said second conductor; and
a rigidizing element residing on a second portion of said deformable elastic membrane, wherein said rigidizing element is centered over said void, wherein said first conductor resides on said rigidizing element residing over said second portion of said deformable elastic membrane.

9. The display system as recited in claim 8, wherein said first conductor in a region around said rigidizing element is at a fixed distance from said second conductor ma inactivated state, wherein said first conductor following a contour of said rigidizing element is at a farther distance from said second conductor in said inactivated state.

10. The display system as recited in claim 8, wherein said first conductor and said deformable elastic membrane are free to move by deformation caused by an application of opposite electrical charges to said first conductor and to said second conductor.

11. The display system as recited in claim 10, wherein when opposite electrical charges are applied to said first conductor and to said second conductor said deformable elastic membrane is restricted from flexing in a vicinity of said rigidizing element.

12. The display system as recited in claim 8, wherein said rigidizing element causes said first conductor to be tiered with respect to spacing between said first conductor and said second conductor thereby causing two different force profiles.

13. The display system as recited in claim 8, wherein a force at a perimeter of said rigidizing element is greater than through a body of said rigidizing element.

14. The display system as recited in claim 13, wherein said deformable elastic membrane is pulled down more strongly at said perimeter of said rigidizing element than at said body of said rigidizing element.

15. A display comprising a plurality of pixels, wherein each of said plurality of pixels includes a first conductor residing on a first portion of a deformable elastic membrane; second conductor residing on a rigid substrate, a standoff structure surrounding a void that keeps said deformable elastic membrane in a spaced-apart parallel relation from said second conductor, and a rigidizing element residing on a second portion of said deformable elastic membrane, said rigidizing element being centered over said void and said first conductor residing on said rigidizing clement residing over said second portion of said deformable elastic membrane.

16. The display as recited in claim 15, wherein said first conductor in a region around said rigidizing element is at a fixed distance from said second conductor in a inactivated state, wherein said first conductor following a contour of said rigidizing element is at a farther distance from said second conductor in said inactivated state.

17. The display as recited in claim 15, wherein said first conductor and said deformable elastic membrane are free to move by deformation caused by an application of opposite electrical charges to said first conductor and to said second conductor.

18. The display as recited in claim 17, wherein when opposite electrical charges are applied to said first conductor and to said second conductor said deformable elastic membrane is restricted from flexing in a vicinity of said rigidizing element.

19. The display as recited in claim 15, wherein said rigidizing element causes said first conductor to be tiered with respect to spacing between said first conductor and said second conductor thereby causing two different force profiles.

20. The display as recited in claim 15, wherein a force at a perimeter of said rigidizing element is greater than through a body of said rigidizing element.

21. The display as recited in claim 20, wherein said deformable elastic membrane is pulled down more strongly at said perimeter of said rigidizing element than at said body of said rigidizing element.

* * * * *

UNITED STATES PATENT AND TRADEMARK OFFICE
CERTIFICATE OF CORRECTION

PATENT NO. : 7,449,759 B2 Page 1 of 1
APPLICATION NO. : 11/215514
DATED : November 11, 2008
INVENTOR(S) : Daniel K. Van Ostrand It is certified that error appears in the above-identified patent and that said Letters Patent is hereby corrected as shown below:

On The Title page, Item (75), lines 1-2, before "Dan Van Ostrand, Round Rock, TX (US)" delete "Martin G. Selbrede, The Woodlands, TX (US); Carey King, Austin, TX (US);";

On The Title page, Item (75), lines 1-2, correct inventor name "Dan Van Ostrand" to "Daniel K. Van Ostrand;";

Col. 10, line 49, in Claim 1, delete "over," and insert --over--;

Col. 11, line 29, in Claim 9, delete "ma" and insert --in a--;

Col. 12, lines 17-18, in Claim 15, delete "clement" and insert --element--.

Signed and Sealed this

Seventeenth Day of February, 2009

JOHN DOLL
*Acting Director of the United States Patent and Trademark Office*